(12) United States Patent
Ichihashi et al.

(10) Patent No.: US 9,709,834 B2
(45) Date of Patent: Jul. 18, 2017

(54) IMAGE DISPLAY APPARATUS

(71) Applicant: PANASONIC CORPORATION, Osaka (JP)

(72) Inventors: Kouki Ichihashi, Osaka (JP); Masahiro Kasano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 723 days.

(21) Appl. No.: 13/718,667

(22) Filed: Dec. 18, 2012

(65) Prior Publication Data

US 2013/0155208 A1   Jun. 20, 2013

(30) Foreign Application Priority Data

Dec. 19, 2011   (JP) .................................. 2011-276799
Nov. 7, 2012    (JP) .................................. 2012-245048

(51) Int. Cl.
*G02F 1/133*   (2006.01)
*G02F 1/1335*  (2006.01)
(Continued)

(52) U.S. Cl.
CPC ..... *G02F 1/13306* (2013.01); *G02B 27/0093* (2013.01); *G02B 27/225* (2013.01);
(Continued)

(58) Field of Classification Search
CPC .............. G02B 27/0093; G02B 27/225; G02F 1/13306; G02F 1/1336; H04N 13/04;
(Continued)

(56) References Cited

U.S. PATENT DOCUMENTS 6,061,083 A      5/2000  Aritake et al.
8,760,592 B2 *   6/2014  Toko ....................... G02F 1/292
                                                        349/12
(Continued)

FOREIGN PATENT DOCUMENTS

JP      09-289655 A    11/1997
JP      11-234705 A     8/1999
JP      2010-529485 A   8/2010

*Primary Examiner* — Christopher S Kelley
*Assistant Examiner* — Deirdre Beasley
(74) *Attorney, Agent, or Firm* — McDermott Will & Emery LLP

(57) ABSTRACT

An image display apparatus includes: an image display panel; a backlight device; first and second liquid crystal prism elements each configured to change a deflection direction of emitted light according to a voltage applied thereto; a position detection section configured to detect a position of a user; and a control section configured to control the voltages applied to the liquid crystal prism elements, on the basis of information of the position of the user detected by the position detection section. Each liquid crystal prism element includes a pair of opposing substrates, a plurality of triangular prisms which have ridge lines extending in a first direction parallel to one side of the image display panel and are arranged between the pair of opposing substrates so as to be aligned along a second direction orthogonal to the first direction, and a liquid crystal sealed between the opposing substrates.

15 Claims, 12 Drawing Sheets

(51) Int. Cl.
  *H04N 13/04*   (2006.01)
  *G02B 27/22*   (2006.01)
  *G02B 27/00*   (2006.01)

(52) U.S. Cl.
  CPC ........... *G02F 1/1336* (2013.01); *H04N 13/04* (2013.01); *H04N 13/0418* (2013.01); *H04N 13/0468* (2013.01)

(58) Field of Classification Search
  CPC ........... H04N 13/0418; H04N 13/0468; H04N 348/54; H04N 349/33
  USPC .............................................. 348/54; 349/33
  See application file for complete search history.

(56) References Cited

U.S. PATENT DOCUMENTS

| | | | |
|---|---|---|---|
| 2008/0303975 A1* | 12/2008 | Mizuno | G02B 5/045 349/62 |
| 2009/0079905 A1* | 3/2009 | Kimura | G02B 6/0053 349/62 |
| 2009/0140962 A1* | 6/2009 | Hwang | G02B 6/0038 345/87 |
| 2009/0237576 A1* | 9/2009 | Nelson | G02B 3/08 349/15 |
| 2009/0244682 A1 | 10/2009 | Saishu et al. | |
| 2010/0053500 A1* | 3/2010 | Sugita | G02B 3/0006 349/62 |
| 2010/0110333 A1* | 5/2010 | Oshima | G02F 1/133606 349/62 |
| 2010/0157026 A1* | 6/2010 | Reichelt | G02B 26/005 348/51 |
| 2010/0194745 A1* | 8/2010 | Leister | G03H 1/2205 345/419 |
| 2011/0080554 A1* | 4/2011 | Toko | F21S 48/1731 349/193 |
| 2011/0090413 A1* | 4/2011 | Liou | G02B 27/2214 349/15 |
| 2011/0096032 A1* | 4/2011 | Nakanishi | G06F 3/0428 345/175 |
| 2011/0205756 A1* | 8/2011 | Kim | G02B 6/0053 362/607 |
| 2011/0216407 A1* | 9/2011 | Olaya | G02B 27/225 359/463 |
| 2011/0234580 A1* | 9/2011 | Wang | G02B 3/0043 345/418 |
| 2011/0279827 A1* | 11/2011 | Onishi | G06F 3/0428 356/614 |
| 2012/0044440 A1* | 2/2012 | Yamahara | G02B 5/0221 349/64 |
| 2012/0287037 A1* | 11/2012 | Shikii | G02B 6/0056 345/156 |
| 2013/0249961 A1* | 9/2013 | Oki | G09G 5/14 345/690 |
| 2015/0301384 A1* | 10/2015 | Koike | G02F 1/1336 349/65 |
| 2016/0067931 A1* | 3/2016 | Yang | B29C 59/026 428/156 |
| 2016/0187699 A1* | 6/2016 | Ju | G02F 1/133528 349/65 |

* cited by examiner

IMAGE DISPLAY APPARATUS

CROSS REFERENCE TO RELATED APPLICATION

The disclosure of Japanese Patent Application Nos. 2011-276799, filed on Dec. 19, 2011, and 2012-245048, filed on Nov. 7, 2012, is incorporated herein by reference.

BACKGROUND

Field

The present disclosure relates to an image display apparatus for displaying an image, such as a liquid crystal display.

Description of the Related Art

Japanese Laid-Open Patent Publication No. 2010-529485 discloses an automatic stereoscopic display that causes images to be stereoscopically viewed by alternately providing light of an image for right eye and light of an image for left eye to the eyes of multiple observers, respectively. In the apparatus disclosed in Japanese Laid-Open Patent Publication No. 2010-529485, the optical refraction behavior by a deflection means is changed so as to follow the eye positions of the observers. The deflection means is composed of electrowetting cells containing two types of immiscible liquids. When a voltage is applied to the electrowetting cells, the interface between the liquids is changed, whereby a prism function is realized by the electrowetting cells.

SUMMARY

The present disclosure provides an image display apparatus that includes a liquid crystal prism element deflecting light according to a position of a viewer and reduces a decrease of a relative brightness and an increase of a crosstalk which are caused by the deflection.

An image display apparatus according to the present disclosure includes: an image display panel; a backlight device located on a back surface side of the image display panel; a first liquid crystal prism element located between the image display panel and the backlight device and configured to change a deflection direction of emitted light according to a voltage applied thereto; a second liquid crystal prism element located between the image display panel and the first liquid crystal prism element and configured to change a deflection direction of emitted light according to a voltage applied thereto; a position detection section configured to detect a position of a user; and a control section configured to control the voltages applied to the first liquid crystal prism element and the second liquid crystal prism element, on the basis of information of the position of the user detected by the position detection section. Each of the first liquid crystal prism element and the second liquid crystal prism element includes a pair of opposing substrates, a plurality of triangular prisms which have ridge lines extending in a first direction parallel to one side of the image display panel and are arranged between the pair of opposing substrates so as to be aligned along a second direction orthogonal to the first direction, and a liquid crystal sealed between the opposing substrates.

The image display apparatus according to the present disclosure is effective for increasing a scan range by using a liquid crystal material and reducing changes of a brightness and a crosstalk at lateral scanning.

DETAILED DESCRIPTION

Figure 1A:
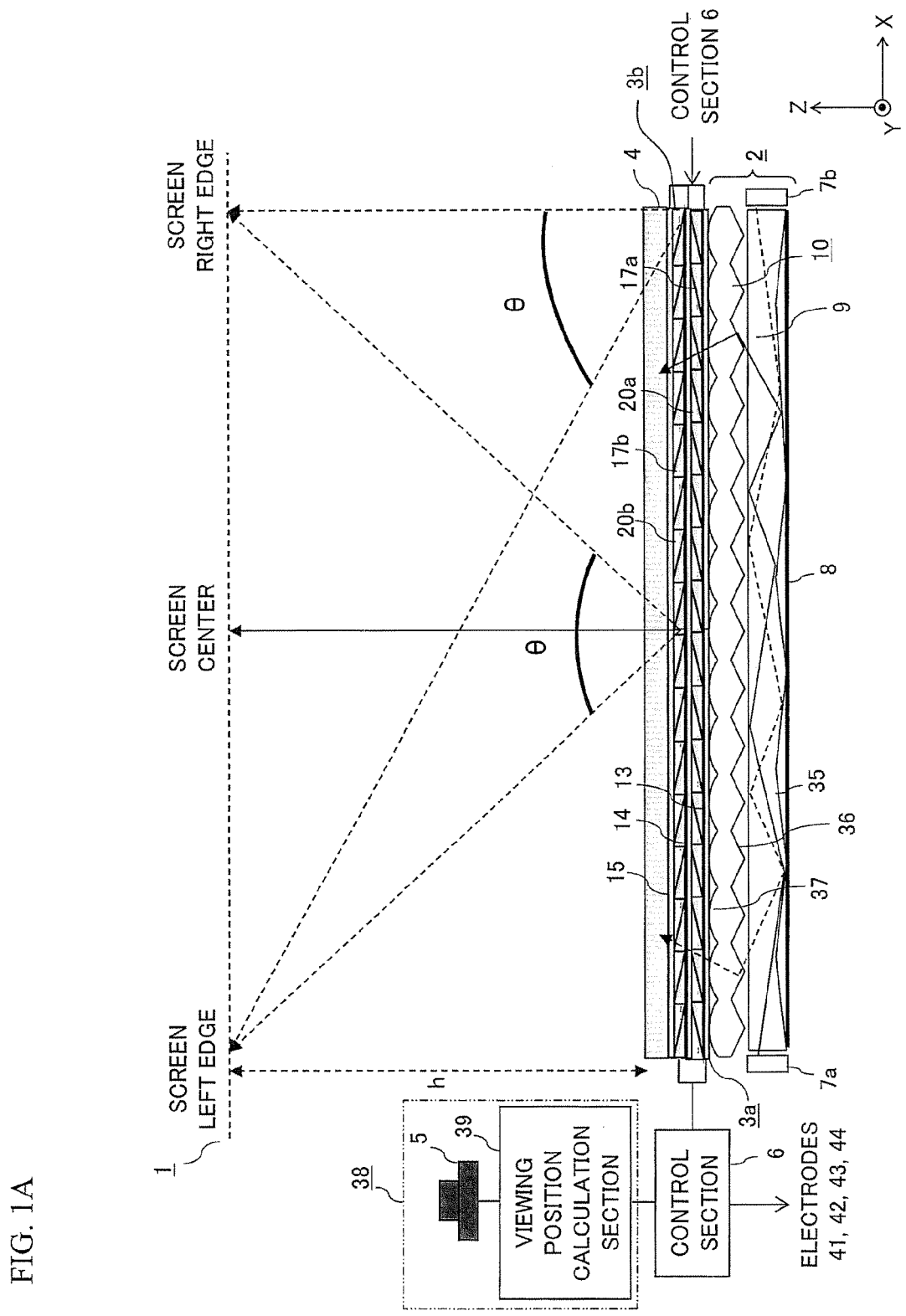
FIG. 1A is a schematic configuration diagram of an image display apparatus according to an embodiment.

Hereinafter, an embodiment will be described in detail with appropriate reference to the drawings. It is noted that a more detailed description than need may be omitted. For example, the detailed description of already well-known matters and the overlap description of substantially same configurations may be omitted. This is to avoid an unnecessarily redundant description below and to facilitate understanding of a person skilled in the art. Furthermore, in the drawings, principal components may be schematically illustrated for easy understanding.

It is noted that the inventor provides the accompanying drawings and the following description in order that a person skilled in the art may fully understand the present disclosure, and do not intend to limit the subject matter defined by the claims.

1. Configuration of Image Display Apparatus

Figure 1B:
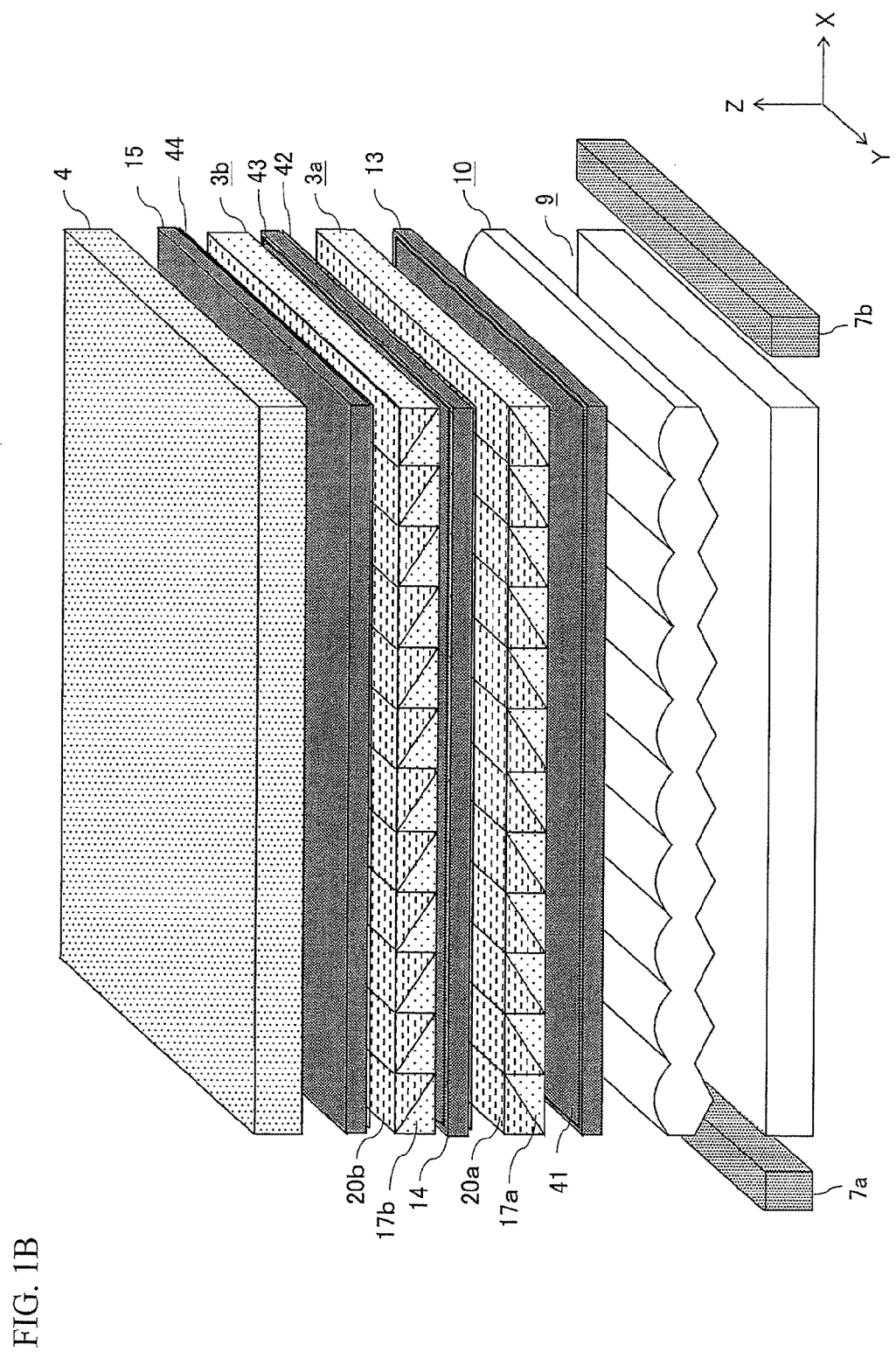
FIG. 1B is an exploded perspective view of a part of the image display apparatus shown in FIG. 1A.

FIG. 1A is a schematic cross-sectional view of an image display apparatus 1 according to the embodiment, and FIG. 1B is an exploded perspective view of a part of the image display apparatus 1 shown in FIG. 1A. It is noted that in FIG. 1A, illustration of electrodes 41, 42, 43, and 44 shown in FIG. 1B is omitted.

In the present embodiment, a three-dimensional orthogonal coordinate system is set for the image display apparatus 1, and a direction is specified by using the coordinate axes. As shown in FIGS. 1A and 1B, an X axis direction coincides with a right-left direction (horizontal direction) when a user faces a display surface of an image display panel 4. A Y axis direction coincides with an up-down direction when the user faces the display surface of the image display panel 4. A Z axis direction coincides with a direction perpendicular to the display surface of the image display panel 4. Here, "facing"

means that the user is located directly in front of the display surface such that, for example, when a letter of "A" is displayed on the display surface, the user sees the letter of "A" from a correct direction. In addition, FIGS. 1A and 1B correspond to views as seen from above the image display apparatus 1. Thus, the left side in FIGS. 1A and 1B corresponds to the right side of the display screen when a viewer sees the display screen.

The image display apparatus 1 includes a light source switching type backlight 2, a liquid crystal prism element 3, the image display panel 4 which displays an image for a right eye and an image for left eye while alternately switching between the image for right eye and the image for left eye, a position detection section 38 which detects the position of a user who uses the image display apparatus 1, and a control section 6 which controls a liquid crystal driving voltage outputted to a first liquid crystal prism element 3a or a second liquid crystal prism element 3b, on the basis of information of the detected position of the user. Hereinafter, each component will be described in detail.

The backlight 2 includes light sources 7a and 7b facing each other, a reflection film 8, a light guide plate 9, and a light control film 10. The reflection film 8 is provided on a lower surface side (back surface side) of the light guide plate 9, and the light control film 10 is provided on an upper surface side (front surface side) of the light guide plate 9.

The light sources 7a and 7b are arranged so as to extend along a pair of side surfaces, respectively, of the light guide plate 9, and face each other in the X axis direction. The light source 7a is located at the left side surface of the light guide plate 9, and the light source 7b is located at the right side surface of the light guide plate 9. Each of the light sources 7a and 7b has a plurality of LED elements arranged in the Y axis direction. Each of the light sources 7a and 7b alternately repeats lighting-up and going-out in synchronization with switching between the image for right eye and the eye image for left eye which are displayed on the image display panel 4. In other words, when the image display panel 4 displays the image for right eye, the light source 7a lights up and the light source 7b goes out, and when the image display panel 4 displays the image for left eye, the light source 7a goes out and the light source 7b lights up.

Light emitted from the light sources 7a and 7b spreads within the light guide plate 9 while being repeatedly totally reflected at the upper surface and the lower surface of the light guide plate 9. Light having an angle equal to or less than the critical angle within the light guide plate 9 is emitted from the upper surface of the light guide plate 9. The lower surface of the light guide plate 9 is composed of a plurality of inclined surfaces 35 as shown in FIGS. 1A and 1B. By these inclined surfaces 35, light propagating within the light guide plate 9 is reflected in various directions, and thus the intensity of the light emitted from the light guide plate 9 becomes uniform across the entire upper surface.

The reflection film 8 is provided on the lower surface side of the light guide plate 9. Light having an angle exceeding the total reflection angles of the inclined surfaces 35 provided in the lower surface of the light guide plate 9 is reflected by the reflection film 8, enters the light guide plate 9 again, and is eventually emitted from the upper surface. The light emitted from the light guide plate 9 is incident on the light control film 10.

On a lower surface of the light control film 10, a plurality of prisms 36 each having a triangular cross section and a ridge line extending in the Y axis direction are aligned along the X axis direction. In other words, on the lower surface of the light control film 10, the prisms 36 each having a triangular cross section are arranged in a one-dimensional array. In addition, on an upper surface of the light control film 10, a plurality of cylindrical lenses 37 extending in the Y axis direction are aligned along the X axis direction. In other words, a lenticular lens is formed on the upper surface of the light control film 10.

The light incident on the lower surface of the light control film 10 is refracted toward the Z axis direction by the prisms 36, converged by the lenticular lens located on the upper surface, and is incident on the first liquid crystal prism element 3a.

Figure 1C:
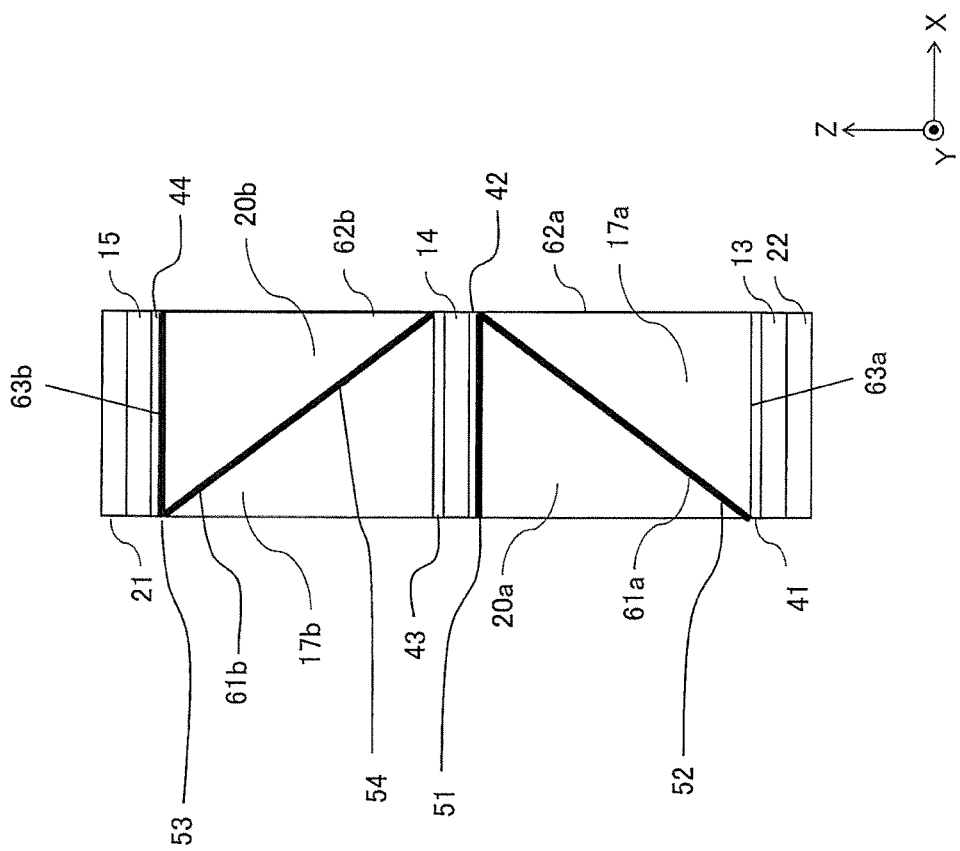
FIG. 1C is a partially enlarged view of liquid crystal prism elements shown in FIG. 1A.

FIG. 1C is a partially enlarged view of the first and second liquid crystal prism elements shown in FIG. 1A. Hereinafter, the first and second liquid crystal prism elements 3a and 3b will be described in detail with reference to FIGS. 1A to 1C.

When the viewer moves in a direction to the left of the screen, the first liquid crystal prism element 3a controls a deflection direction according to the movement of the viewer. When the viewer moves in a direction to the right of the screen, the second liquid crystal prism element 3b controls a deflection direction according to the movement of the viewer.

More specifically, the first liquid crystal prism element 3a includes a pair of opposing substrates 13 and 14, a plurality of first prisms 17a and a liquid crystal layer 20a sealed between the opposing substrates 13 and 14, the electrode 41 provided on an inner surface of the opposing substrate 13, the electrode 42 provided on a lower surface of the opposing substrate 14, an alignment film 51 provided on a lower surface of the electrode 42, and an alignment film 52 provided on a first inclined surface 61a of each first prism 17a. In the present embodiment, a plurality of the first prisms 17a are disposed with respect to the single electrode 41 or the single electrode 42.

Meanwhile, the second liquid crystal prism element 3b includes a pair of opposing substrates 14 and 15, a plurality of second prisms 17b and a second liquid crystal layer 20b sealed between the opposing substrates 14 and 15, the electrode 43 provided on an upper surface of the opposing substrate 14, the electrode 44 provided on an inner surface of the opposing substrate 15, an alignment film 53 provided on a lower surface of the electrode 44, and an alignment film 54 provided on a second inclined surface 61b of each second prism 17b. In the present embodiment, a plurality of the second prisms 17b are disposed with respect to the single electrode 43 or the single electrode 44.

Here, in the present embodiment, the transmission axes of the polarizers 21 and 22 extend in the Y axis direction. In other words, light of components in vibration directions other than the Y axis direction is absorbed.

Each first prism 17a is formed in a triangular pole shape having a right-triangular cross section and a ridge line extending in the Y axis direction, and has the first inclined surface 61a, a first side surface 62a, and a first bottom surface 63a.

Each second prism 17b is formed in a triangular pole shape having a right-triangular cross section and a ridge line extending in the Y axis direction, and has the second inclined surface 61b, a second side surface 62b, and a second bottom surface 63b. Each second prism 17b is disposed in such an orientation that the first prism 17a is rotated by 180 degrees about a rotation axis parallel to the Z axis. In other words, the orientation of each first prism 17a is laterally opposite to the orientation of each second prism 17b.

Furthermore, the alignment films 51 and 52 which are subjected to orientation treatment for controlling the orientation directions of liquid crystal molecules into a desired direction are provided on the surfaces of the first prisms 17a and the electrodes 42.

Meanwhile, the alignment films 53 and 54 which are subjected to orientation treatment for controlling the orientation directions of liquid crystal molecules into a desired direction are provided on the surfaces of the second prisms 17b and the electrode 44.

The alignment films 51, 52, 53, and 54 orient the liquid crystal molecules such that the long axes of the liquid crystal molecules extend in the Y axis direction in a state where no voltage is applied to the electrodes 41, 42, 43, and 44. It is noted that the alignment films 51, 52, 53, and 54 may be omitted as long as the orientations of the liquid crystal molecules are kept uniform.

As the materials of the opposing substrates 13, 14, and 15, the first prisms 17a, and the second prisms 17b, glass or resin can be used. When resin is used as the materials of the first prisms 17a and the second prisms 17b, the first prisms 17a and the second prisms 17b can be formed by, as an example, imprinting a UV-curing resin on a glass substrate.

The first liquid crystal prism element 3a can be produced by forming a one-dimensional array of the first prisms 17a on the opposing substrate 13 on which the electrode 41 has been formed, then attaching together the opposing substrate 13 and the opposing substrate 14 on which the electrode 42 has been formed, and injecting a liquid crystal between the opposing substrates 13 and 14.

The second liquid crystal prism element 3b can be produced by forming a one-dimensional array of the second prisms 17b on the opposing substrate 14 on which the electrode 43 has been formed, then attaching together the opposing substrate 14 and the opposing substrate 15 on which the electrode 44 has been formed, and injecting a liquid crystal between the opposing substrates 14 and 15.

Each of the first liquid crystal prism element 3a and the second liquid crystal prism element 3b is an element that can control the magnitude of the deflection angle of transmitted light according to the magnitude of a voltage applied from the outside. The principle will be described briefly. In general, a liquid crystal molecule has an ellipsoidal shape and has different dielectric constants in the longitudinal direction and the lateral direction thereof. Thus, each of the first liquid crystal layer 20a and the second liquid crystal layer 20b has a birefringence property in which a refractive index is different for each polarization direction of incident light. In addition, when the direction of the orientation (director) of each liquid crystal molecule relatively changes with respect to the polarization direction of light, the refractive index of each of the first liquid crystal layer 20a and the second liquid crystal layer 20b also changes. Thus, when the orientation of the liquid crystal is changed by an electric field generated by applying a certain voltage, the refractive index for transmitted light changes, and thus a deflection angle which is a refraction angle of the light changes.

In the present embodiment, a case where uniaxial negative type liquid crystal is used as the material forming each of the first liquid crystal layer 20a and the second liquid crystal layer 20b will be considered. Then, a case where the liquid crystal molecules are oriented in the Y axis direction when no voltage is applied as described above and a case where the liquid crystal molecules are oriented in the Z axis direction when a voltage is applied will be considered.

Since the transmission axes of the polarizers 21 and 22 extend in the Y axis direction, the refractive index of each of the first liquid crystal layer 20a and the second liquid crystal layer 20b when no voltage is applied thereto is an extraordinary light refractive index, and the refractive index of each of the first liquid crystal layer 20a and the second liquid crystal layer 20b when a voltage is applied thereto is an ordinary light refractive index.

In general, in the case where light is deflected by an active element such as the first liquid crystal prism element 3a and the second liquid crystal prism element 3b, it is desirable to use a liquid crystal material having a great difference between the refractive index ne for extraordinary light and the refractive index no for ordinary light, in order to increase a deflection angle. However, among commercially available materials, the number of liquid crystal materials having a great difference between the refractive index no for ordinary light and the refractive index ne for extraordinary light is small, and the difference is generally about 0.2.

In addition, even when the liquid crystal prism is formed using the same liquid crystal material, design of the orientation direction and a manner of applying an electric field are important items that have a great influence on the element performance, which is the ability of the liquid crystal prism element, such as a deflection angle, electric power, a switching speed.

In the present embodiment, the same material is used for the first prisms 17a and the second prisms 17b. In addition, the same material is used for the first liquid crystal layer 20a and the second liquid crystal layer 20b. The refractive indexes of the first prisms 17a and the second prisms 17b are substantially equal to the extraordinary light refractive indexes of the first liquid crystal layer 20a and the second liquid crystal layer 20b, respectively. Then, when deflection is performed toward the screen left side as shown in FIG. 1A, a voltage is applied to the first liquid crystal prism element 3a, and when deflection is performed toward the screen right side, a voltage is applied to the second liquid crystal prism element 3b.

Light transmitted through the first liquid crystal prism element 3a and the second liquid crystal prism element 3b is incident on the image display panel 4. One example of the image display panel 4 is an in-plane-switching type panel. However, another type of image display panel can be used as the image display panel 4. Light transmitted through the image display panel 4 has directivity and is converged at the position of an eye of the viewer.

The image display apparatus 1 switches between the light sources 7a and 7b in synchronization with switching between the image for right eye and the image for left eye. In addition, when the switching between the image for right eye and the image for left eye is performed at a frequency equal to or higher than 120 Hz, the user can recognize a stereoscopic image on the basis of the image for right eye and the image for left eye.

The position detection section 38 includes a camera 5 and a viewing position calculation section 39. The camera 5 takes an image of the user in predetermined cycles. The viewing position calculation section 39 analyzes the image taken by the camera 5 and calculates viewing position information representing a viewing position of the user. For image analysis performed by the camera 5, a known algorithm for recognizing the position of a face or a portion (eyes, nose, etc.) of a face can be used. In addition, the viewing position information calculated by the viewing position calculation section 39 preferably represents the positions of the eyes of the user, but may represent the position of the face, the nose, or the like instead of the positions of the eyes.

The control section 6 controls the value of a voltage applied to the first liquid crystal prism element 3a and the second liquid crystal prism element 3b, on the basis of the viewing position information calculated by the viewing position calculation section 39. More specifically, when the viewing position of the user shifts from a position in front of the screen center to the left edge side as shown in FIG. 1A, a voltage corresponding to the viewing position of the user is applied to the first liquid crystal prism element 3a to perform deflection. On the other hand, when the viewing position of the user shifts from the position in front of the screen center to the right edge side as shown in FIG. 1A, a voltage corresponding to the viewing position of the user is applied to the second liquid crystal prism element 3b to perform deflection. In addition, since the extraordinary light refractive indexes of the first prisms 17a, the second prisms 17b, the first liquid crystal layer 20a, and the second liquid crystal layer 20b are set so as to be substantially equal to each other, a state where no voltage is applied is set when the viewing position of the user is in front of the screen center.

It is noted that the deflection angles of the first liquid crystal prism element 3a and the second liquid crystal prism element 3b, and position information of a converged point of light with respect to an applied voltage can be assumed at the stage of designing, and thus it suffices to previously prepare data that associates an applied voltage with position information and to store the data in a storage unit provided in the image display apparatus 1. In addition, after completion of a product, calibration may be performed to correct the position of a light converged point.

By repeating the above-described deflection control based on the viewing position information in predetermined cycles, it is made possible for the viewer to view a stereoscopic image at an arbitrary location even when the viewer freely moves relative to the image display apparatus 1. Thus, according to the present disclosure, an image display apparatus having a wide view range can be realized. In addition, by converging light at the position of an eye of the viewer, a high-brightness and energy-saving image display apparatus 1 can be realized.

In the present embodiment, the light guide plate is shared by the light sources 7a and 7b. However, a light guide plate for the light source 7a and a light guide plate for the light source 7b may be provided so as to be laminated on each other.

In addition, instead of the control film 10 in which the prisms and the lenticular lens are integrated, a prism sheet and a lenticular lens sheet may be individually provided.

Furthermore, the backlight 2 is not limited to have the configuration shown in FIGS. 1A and 1B, and may have another configuration as long as it can alternately emit light for right eye and light for left eye in a time division manner in synchronization with switching between right and left image signals.

Furthermore, the configuration has been described in which the substrate 14 is shared by the first liquid crystal prism element 3a and the second liquid crystal prism element 3b. However, the substrate 14 may be divided into a part for the first liquid crystal prism element 3a and a part for the second liquid crystal prism element 3b.

Furthermore, the present embodiment has been described with, as an example, a stereoscopic image display apparatus that displays, in a time division manner, an image for right eye and an image for left eye that have a parallax. However, an image having no parallax may be displayed. In this case, the light sources 7a and 7b are constantly lit up instead of being alternately lit up. In addition to the case of displaying a three-dimensional image, also when a two-dimensional image is displayed, the displayed content can be prevented from being seen by surrounding people and privacy protection can also be improved, by following movement of the viewer and projecting an image only on the eyes of the viewer and the vicinity thereof in a reduced range.

2. Detailed Description of Liquid Crystal Prism Element

The liquid crystal prism element of the present disclosure will be described in detail.

First, conditions for a liquid crystal prism element according to a comparative example will be described. The vertical distance (h in FIG. 2) between the viewer and the image display apparatus is set to 370 mm, the extraordinary light refractive index ne of the liquid crystal material is set to 1.4, the ordinary light refractive index no of the liquid crystal material is set to 1.8, and the refractive index n of each prism is set to 1.6.

2-1. Liquid Crystal Prism Element According to Comparative Example

Figure 2:
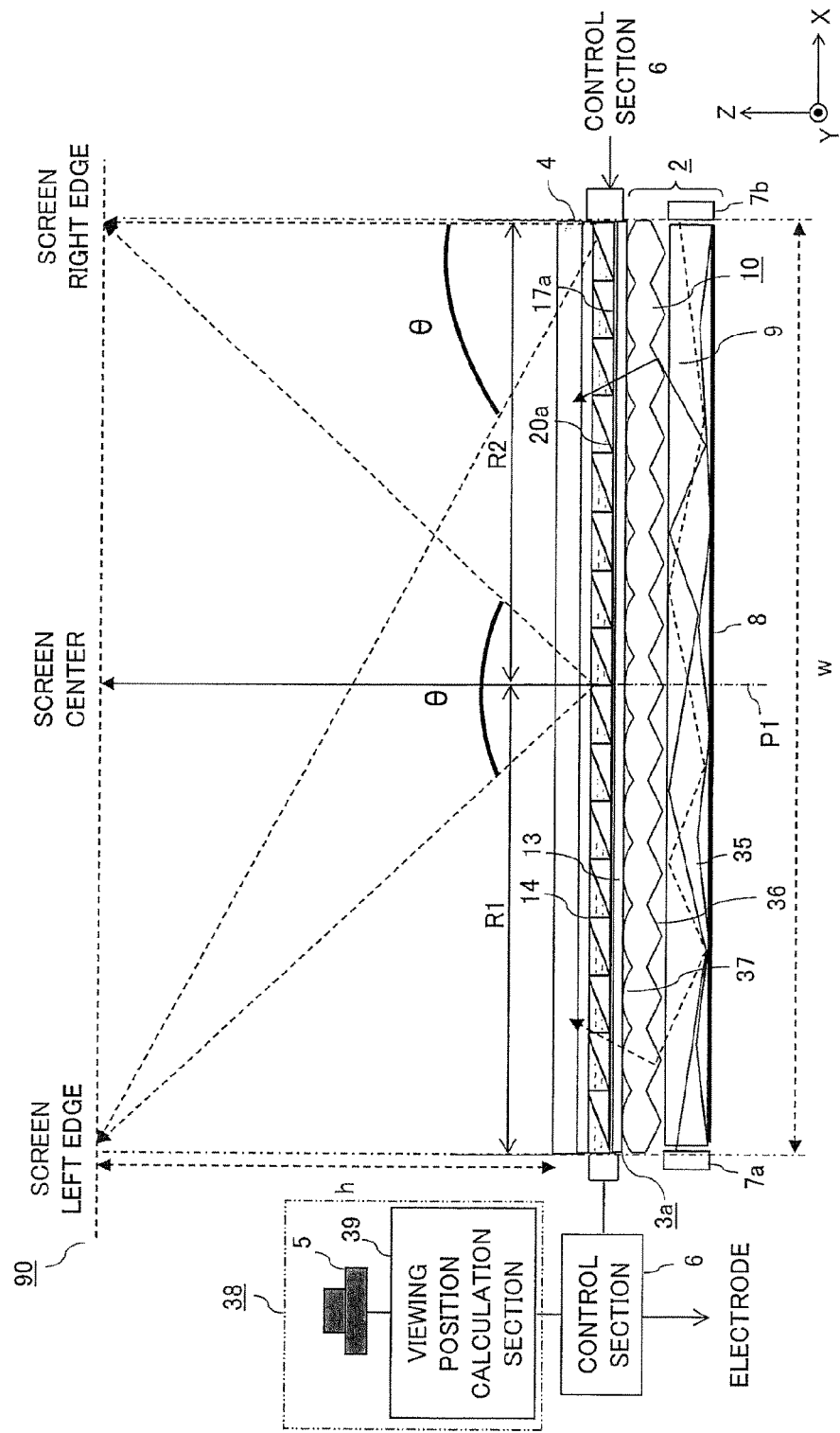
FIG. 2 is a schematic configuration diagram of an image display apparatus according to a comparative example.
Figure 3:
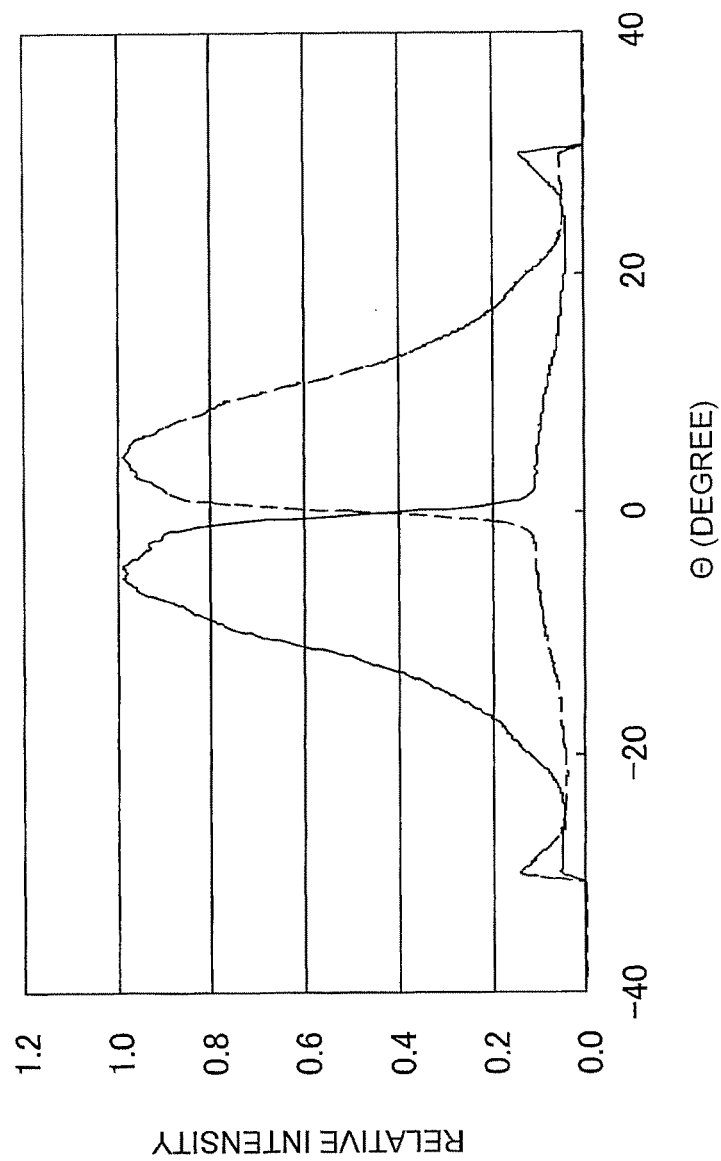
FIG. 3 is a diagram illustrating light distributions of light incident on the liquid crystal prism elements of the image display apparatuses according to the comparative example and the embodiment.

In an image display apparatus 90 according to the comparative example, as shown in FIG. 2, only the first liquid crystal prism element 3a is provided, and the second liquid crystal prism element 3b is not provided. Light having light distributions as shown in FIG. 3 is incident on the first liquid crystal prism element 3a. In the graph of FIG. 3, a solid line indicates a light distribution of an image for right eye, and a dotted line indicates a light distribution of an image for left eye. Such light distributions are obtained when the light guide plate 9 and the light control film 10 are designed in appropriate shapes.

When the viewer is in front of the screen center, an applied voltage is controlled such that the refractive index of the first liquid crystal layer 20a becomes 1.6, in order to cause the refractive indexes of the first liquid crystal layer 20a and each first prism 17a to be the same. In this case, light near the peak values of the light distributions shown in FIG. 3 is incident on the right eye and the left eye of the viewer to obtain a bright image.

When the viewer moves in the direction to the left of the screen, an applied voltage is controlled such that the refractive index of the first liquid crystal layer 20a becomes greater than 1.6, and when the viewer moves in the direction to the right of the screen, an applied voltage is controlled such that the refractive index of the first liquid crystal layer 20a becomes less than 1.6.

Figure 4:
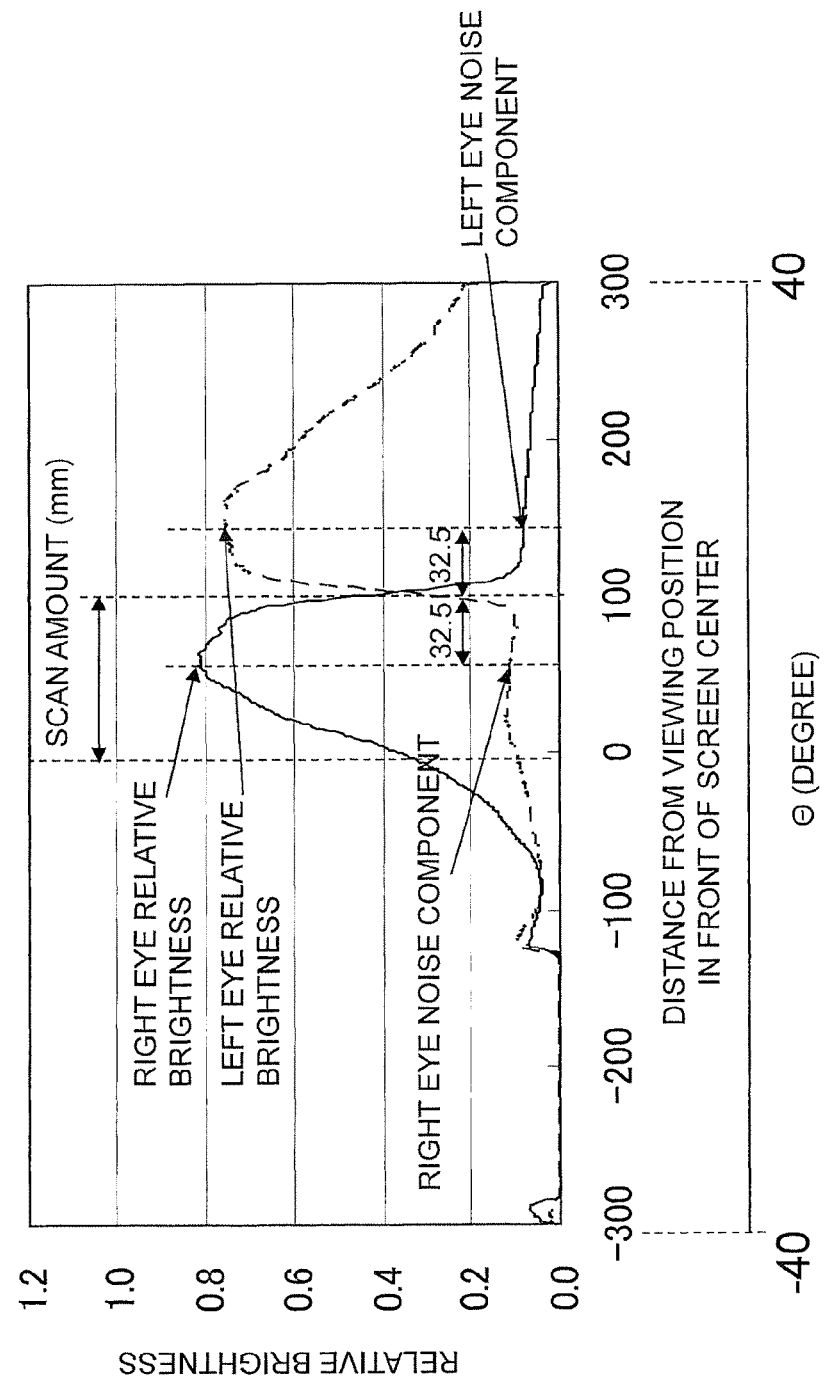
FIG. 4 is a diagram explaining scan amounts, relative brightnesses, and crosstalks of the image display apparatuses according to the comparative example and the embodiment.

FIG. 4 shows light distributions at a viewing position in the case where the Fresnel angle of each first prism 17a is set to 50 degrees and the refractive index of the first liquid crystal layer 20a is set to 1.4. The horizontal axis indicates a distance from the screen center along the X axis direction. It is recognized that light distributions for right eye and left eye are scanned in the rightward direction of the screen (in the plus X direction). In addition, the intensities and the like of the light distributions also change along with the scanning.

Here, physical amounts are defined. The distance from the viewing position in front of the screen center (X=0 mm) to the point where the light distribution for right eye and the light distribution for left eye intersect each other is defined as a scan amount. In addition, the position of the point where the light distribution for right eye and the light distribution for left eye intersect each other is defined as a scan position. The brightness of the light distribution for right eye at a position shifted from the scan position along the X direction by −32.5 mm is defined as a right eye relative brightness. Reversely, the brightness of the light distribution for left eye at a position shifted from the scan position along the X direction by +32.5 mm is defined as a left eye relative brightness. If the interval between both eyes of the viewer is 65 mm, when the midpoint between both eyes of the viewer (the position between the eyebrows) coincides with the scan position, both eyes are located at positions of ±32.5 mm from the scan position, resulting in that the brightnesses at the positions correspond to the brightnesses of images.

In addition, at the position where the right eye relative brightness is defined, namely, at the position of the right eye of the viewer, the light distribution for left eye also has a brightness. The light for left eye becomes unnecessary light for the viewer, and thus the brightness of the light distribution of the light for left eye which enters the right eye is defined as a right eye noise component. Then, the proportion of the right eye noise component to the right eye relative brightness is defined as a right eye crosstalk.

Meanwhile, at the position where the left eye relative brightness is defined, namely, at the position of the left eye of the viewer, the light distribution for right eye also has a brightness. The light for right eye becomes unnecessary light for the viewer, and thus the brightness of the light distribution of the light for right eye which enters the left eye is defined as a left eye noise component. Then, the proportion of the left eye noise component to the left eye relative brightness is defined as a left eye crosstalk.

Calculation of the physical amounts defined above is performed. The calculation is performed by illumination analysis. Specifically, the light distributions shown in FIG. 3 and the shape and refractive index of the liquid crystal prism element are provided as input parameters, and a ray corresponding to each light distribution is calculated by ray tracing, a photoreceiver is provided at the position of the viewer, and brightness distributions are obtained. Then, from the obtained brightness distributions, the scan amount, the relative brightnesses, and the crosstalks which are defined as described above are obtained. The results are shown in FIGS. 5A to 5C.

It is noted that the Fresnel angle of each first prism 17a is set to 30 degrees, 40 degrees, 50 degrees, and 60 degrees. In addition, in each of the graphs of FIGS. 5A to 5C, the horizontal axis indicates Δn (=the refractive index of the first liquid crystal layer 20a—the refractive index of the first prism 17a).

Figure 5A:
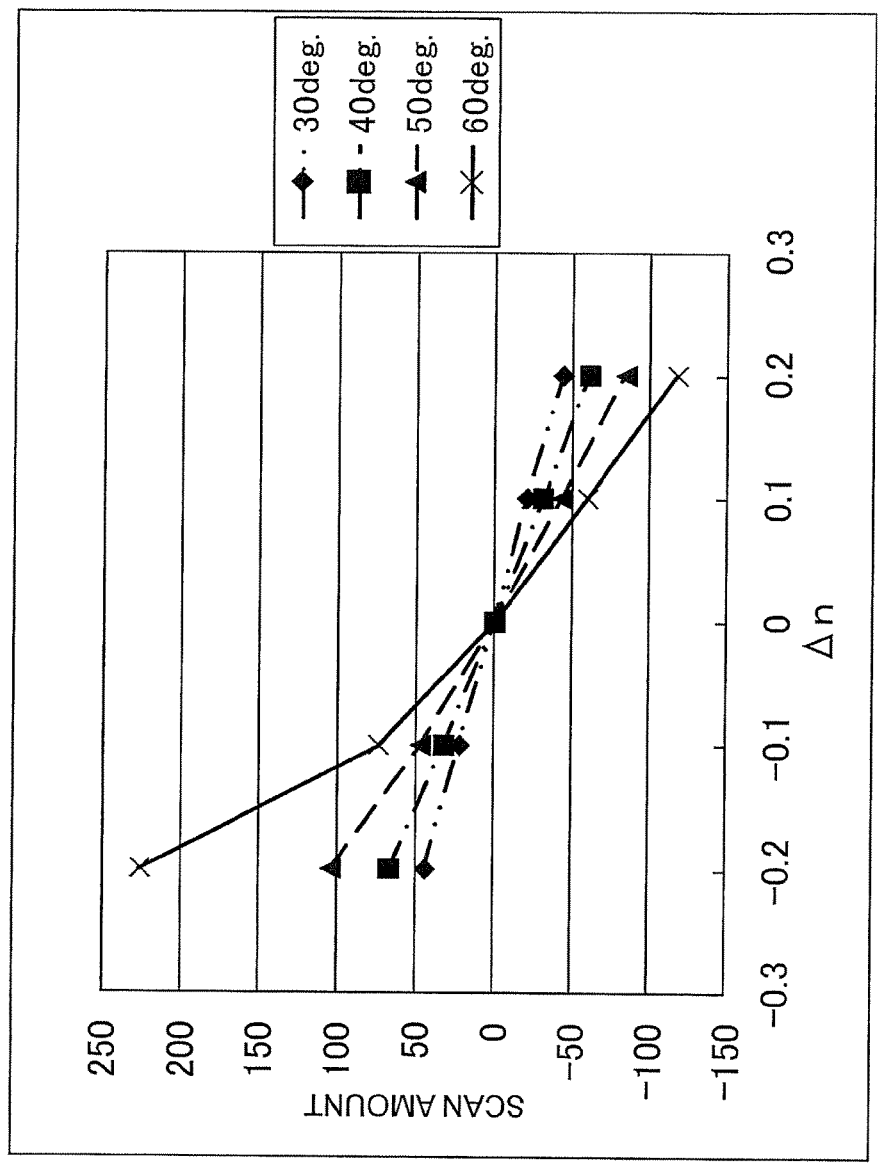
FIG. 5A is a diagram representing the scan amount of the image display apparatus according to the comparative example.

FIG. 5A shows the calculation result of the scan amount. The higher the Fresnel angle is, the larger the width of the scan amount is.

Figure 5B:
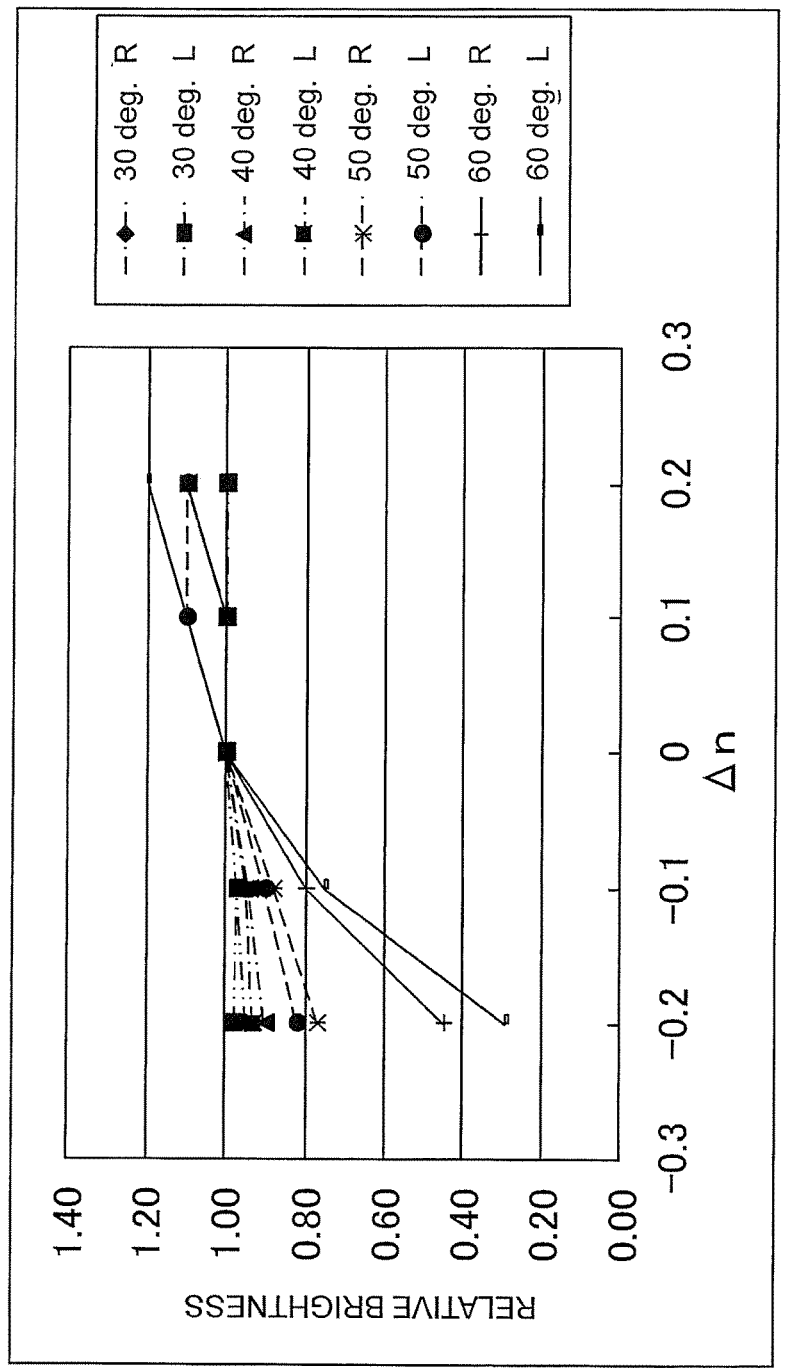
FIG. 5B is a diagram representing the relative brightnesses of the image display apparatus according to the comparative example.
Figure 5C:
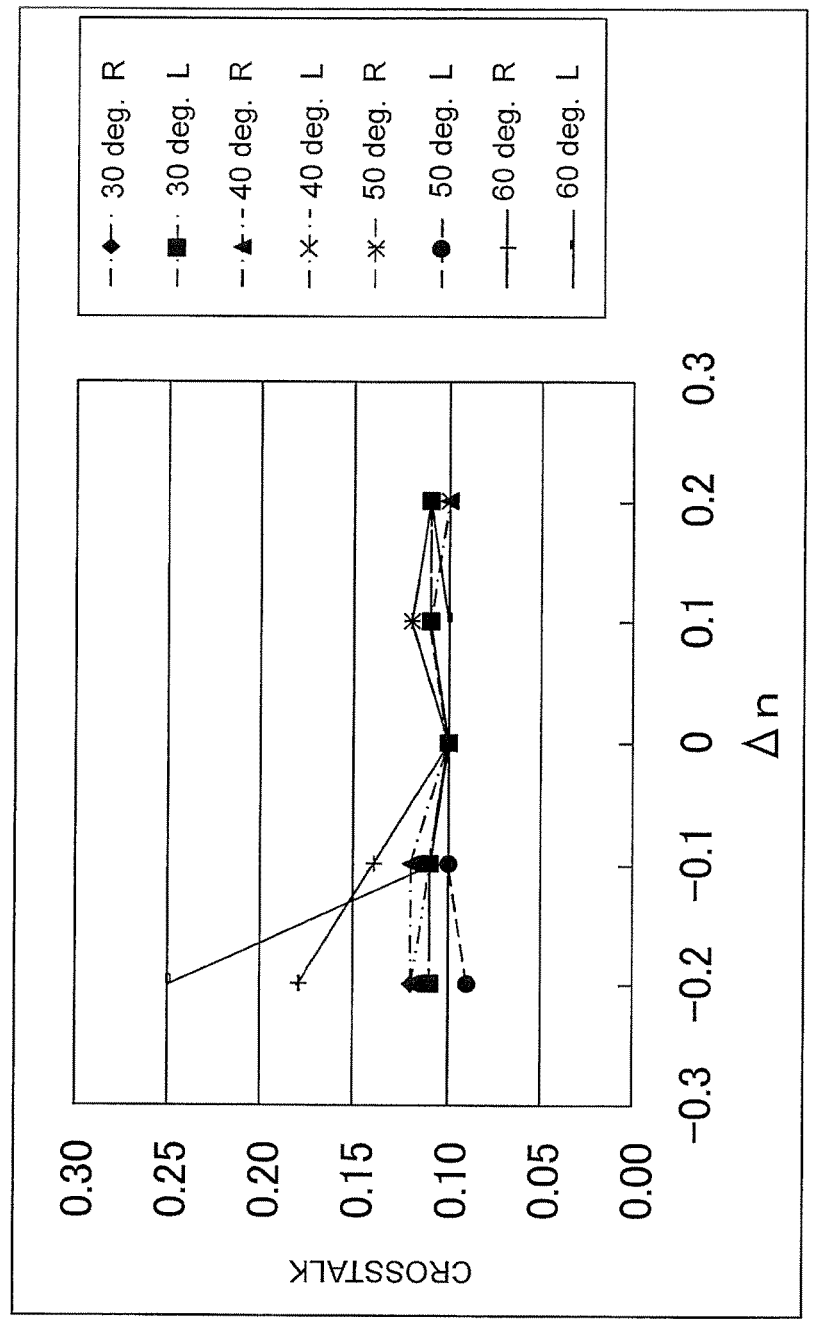
FIG. 5C is a diagram representing the crosstalks of the image display apparatus according to the comparative example.

FIG. 5B shows the calculation results of the right eye relative brightness and the left eye relative brightness. When Δn is negative, the relative brightness becomes low. When the Fresnel angle is 60 degrees and Δn is −0.2, the right eye relative brightness becomes 45%, and the left eye relative brightness becomes 29%. The relative brightness being low means that an image provided to the viewer becomes dark.

FIG. 5C shows the results of the crosstalks. When Δn is negative, the value of the crosstalk becomes high. For example, when the Fresnel angle is 60 degrees, the left eye crosstalk becomes 25%. If the crosstalk is high, double images are viewed by the viewer, leading to deterioration of image quality.

2-2. Liquid Crystal Prism Element According to Embodiment

Next, the present embodiment will be described.

In the embodiment, the vertical distance (h in FIG. 1A) between the viewer and the image display apparatus is set to 370 mm, the extraordinary light refractive index ne of the liquid crystal material of the first liquid crystal layer 20a and the second liquid crystal layer 20b is set to 1.6, the ordinary light refractive index no of the liquid crystal material is set to 1.8, and the refractive index n of each of the first prisms 17a and the second prisms 17b is set to 1.6.

Similarly to the comparative example, light having light distributions as shown in FIG. 3 is incident on the first liquid crystal prism element 3a and the second liquid crystal prism element 3b. In the graph of FIG. 3, the solid line indicates the light distribution of an image for right eye, and the dotted line indicates the light distribution of an image for left eye.

When the viewer is in front of the screen center, no voltage is applied to the first liquid crystal prism element 3a and the second liquid crystal prism element 3b. In this case, the refractive indexes of the first liquid crystal layer 20a and the second liquid crystal layer 20b are 1.6, and are equal to the refractive indexes of the first prisms 17a and the second prisms 17b. Thus, the light incident on the first liquid crystal prism element 3a and the second liquid crystal prism element 3b is not refracted at the interface between each prism and each liquid crystal element and is transmitted through the first liquid crystal prism element 3a and the second liquid crystal prism element 3b. In this case, since light near the peak values of the light distributions shown in FIG. 3 is incident on the right eye and the left eye of the viewer in front of the screen center, a bright image is obtained.

When the viewer moves in the direction to the left of the screen from the position in front of the screen center, an applied voltage is controlled such that the refractive index of the first liquid crystal layer 20a becomes greater than 1.6. At that time, no voltage is applied to the second liquid crystal layer 20b. On the other hand, when the viewer moves in the direction to the right of the screen from the position in front of the screen center, an applied voltage is controlled such that the refractive index of the second liquid crystal layer 20b becomes greater than 1.6. In other words, when the viewer moves in the direction to the left of the screen, the first liquid crystal prism element 3a is used to scan light, and when the viewer moves in the direction to the right of the screen, the second liquid crystal prism element 3b is used to scan light.

Figure 6A:
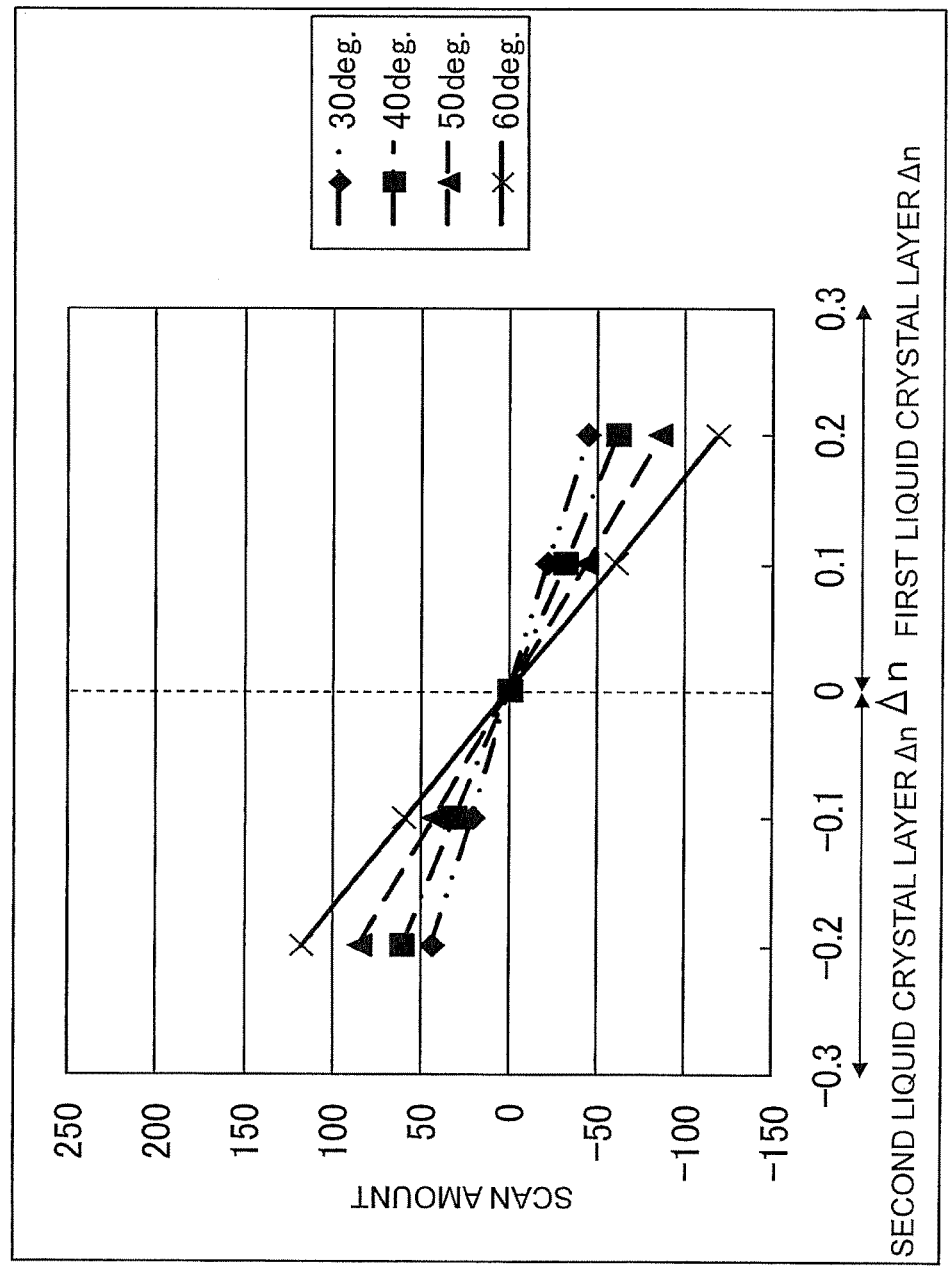
FIG. 6A is a diagram representing the scan amount of the image display apparatus according to the embodiment.
Figure 6B:
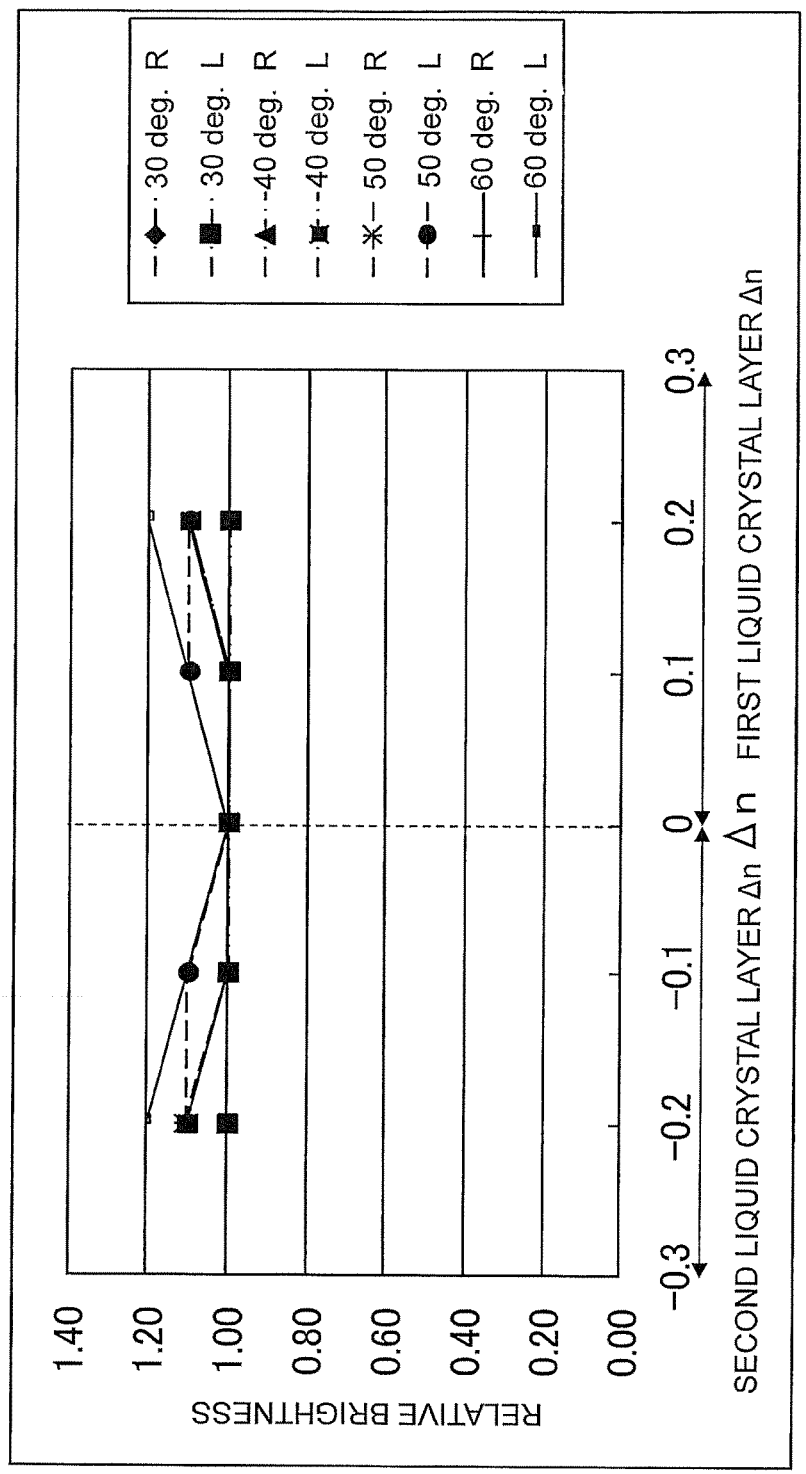
FIG. 6B is a diagram representing the relative brightnesses of the image display apparatus according to the embodiment.
Figure 6C:
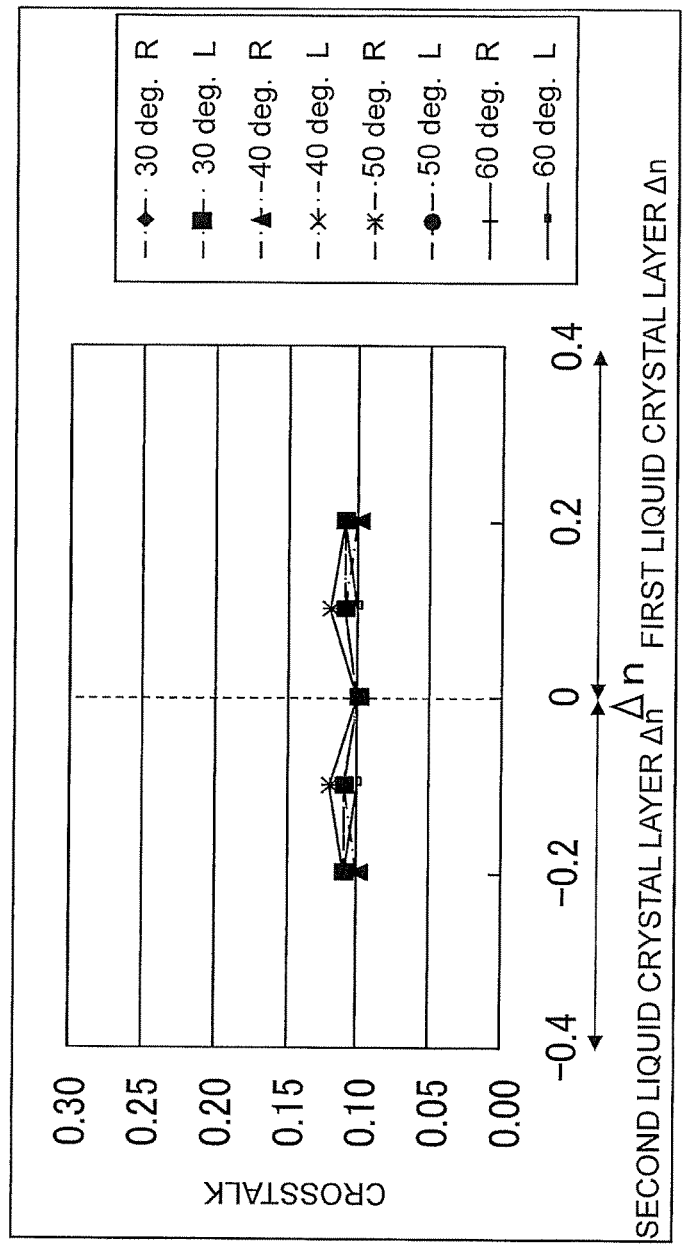
FIG. 6C is a diagram representing the crosstalks of the image display apparatus according to the embodiment.

The calculation results of the scan amount, the relative brightnesses, and the crosstalks in the present embodiment are shown in FIGS. 6A to 6C. In FIGS. 6A to 6C, the right half of each graph shows plots in the case where Δn of the first liquid crystal layer 20a is controlled, and the left half of each graph shows plots in the case where Δn of the second liquid crystal layer 20b is controlled.

When compared to the comparative example, deterioration of the relative brightness and increase of the crosstalk when Δn is changed are reduced. In the comparative example, entire scanning is performed from the left side to the right side by using only the first liquid crystal prism element 3a, and Δn is changed from the minus side to the plus side. Thus, as understood from FIGS. 5B and 5C, the rates of the deterioration of the relative brightness and the increase of the crosstalk are high when Δn is negative.

Meanwhile, in the present embodiment, the first liquid crystal prism element 3a and the second liquid crystal prism element 3b are selectively used for left-side scanning or right-side scanning, whereby only the range where Δn is positive can be used. Therefore, the deterioration of the relative brightness and the increase of the crosstalk can be reduced. In addition, in the comparative example, the refractive index of the first liquid crystal layer 20a is changed from 1.4 to 1.8, whereas a large scan amount is obtained with a change in refractive index from 1.6 to 1.8 in the present embodiment. Delta n of a general liquid crystal material is about 0.2. In the comparative example, if the range from −0.1 to 0.1 of Δn is taken, the scan amount is −74 mm to 60 mm even when the Fresnel angle is 60 degrees. Meanwhile, in the present embodiment, when the Δn is in the range of 0 to 0.2 and the Fresnel angle is 60 degrees for each of the right and left, a scan amount of −118 mm to 118 mm is obtained by using the first liquid crystal prism element 3a and the second liquid crystal prism element 3b.

3. Advantageous Effects Etc.

The image display apparatus 1 according to the present embodiment includes the image display panel 4, the backlight device 2 located on the back surface side of the image display panel 4, the first liquid crystal prism element 3a which is located between the image display panel 4 and the backlight device 2 and changes a deflection direction of emitted light according to a voltage applied thereto, the second liquid crystal prism element 3b which is located between the image display panel 4 and the first liquid crystal prism element 3a and changes a deflection direction of emitted light according to a voltage applied thereto, the position detection section 38 which detects the position of the user, and the control section 6 which controls the voltage applied to each liquid crystal prism element on the basis of information of the position of the user detected by the position detection section 38. The first and second liquid crystal prism elements 3a and 3b have the opposing substrates 13, 14, and 15, and pluralities of the first and second triangular prisms 17a and 17b which have the ridge lines extending in a first direction parallel to one side of the image display panel 4 and are arranged between a pair of the opposing substrates so as to be aligned along a second direction orthogonal to the first direction, and the first and second liquid crystal layers 20a and 20b sealed between the opposing substrates.

Therefore, a large scan amount is obtained. Thus, the range where stereoscopic video is viewed by the viewer can be widened.

In the image display apparatus 1 according to the present embodiment, in the lateral scanning direction, left-side scanning is performed by using one of the first liquid crystal prism element 3a and the second liquid crystal prism element 3b, and right-side scanning is performed by using the other liquid crystal prism element. Thus, a large scan amount is obtained. Therefore, the range where stereoscopic video is viewed by the viewer can be widened.

In the image display apparatus 1 according to the present embodiment, each first triangular prism 17a constituting the first liquid crystal prism element 3a and each second triangular prism 17b constituting the second liquid crystal prism element 3b are substantially right-triangular. The inclination direction of the inclined surface of each first triangular prism 17a of the first liquid crystal prism element 3a is opposite to the inclination direction of the inclined surface of each second triangular prism 17b of the second liquid crystal prism element 3b. Thus, vignetting of a light beam at each prism wall surface can be reduced. In addition, increase of the crosstalk and decrease of the relative brightness by scanning can be reduced. Therefore, the viewer can comfortably view stereoscopic video.

In the image display apparatus 1 according to the present embodiment, the first liquid crystal prism element 3a and the second liquid crystal prism element 3b are formed, and the minimum value of the refractive index of the liquid crystal which varies in response to an applied voltage is substantially equal to the refractive indexes of the first triangular prisms 17a and the second triangular prisms 17b. Since the materials of the first liquid crystal prism element and the second liquid crystal prism element can be the same, a low-cost configuration can be realized.

The image display apparatus according to the present disclosure automatically deflects a light beam to the position of the viewer on the basis of the position information of the viewer. Therefore, the present disclosure is applicable to a high-brightness, high-efficiency, and high-resolution image display apparatus. In addition, the present disclosure is widely applicable not only to use of displaying a three-dimensional image but also to use of displaying a two-dimensional image. Furthermore, the present disclosure is applicable to a 3D liquid crystal display apparatus, a privacy display, and the like by a simple configuration.

The embodiment has been described above as illustrative examples of the technology in the present disclosure. For that, the accompanying drawings and the detailed description have been provided.

Therefore, the constituent elements described in the accompanying drawings and the detailed description may include not only constituent elements essential for solving the problems but also constituent elements non-essential for solving the problems, in order to illustrate the technology described above. Thus, these non-essential constituent elements should not be readily recognized as being essential, due to these non-essential constituent elements being described in the accompanying drawings and the detailed description.

Furthermore, since the embodiment described above are intended to illustrate the technology in the present disclosure, various changes, substitutions, additions, omissions, and the like can be made within the scope of the claims and the scope of equivalents thereof.

What is claimed is:
1. An image display apparatus comprising:
an image display panel having a first surface and a second surface opposing to the first surface, and configured to display an image;
a light device located on a first surface side of the image display panel, and configured to emit light to the first surface of the image display panel;
a first variable deflection element located between the image display panel and the light device, including first triangular prisms which have ridge lines extending in a first direction, the first triangular prisms being arranged along a second direction perpendicular to the first direction, the first variable deflection element being configured to variably change a deflection direction of the light along the second direction as the light passes through the first variable deflection element, the first direction being parallel to a single straight line;
a second variable deflection element distinct from the first variable deflection element, located between the image display panel and the first variable deflection element, including second triangular prisms which have ridge lines extending in the first direction, the second triangular prisms being arranged along the second direction, the second variable deflection element being configured to variably change a deflection direction of the light along the second direction as the light passes through the second variable deflection element, the ridge lines of the first triangular prisms extend parallel to the ridge lines of the second triangular prisms; and
a position detector configured to detect a user position of a user, who is watching the image on the image display panel, in the second direction, wherein, when the user position detected by the position detector moves along the second direction, at least one of the first variable deflection element and the second variable deflection element changes the deflection direction along the second direction, and each of the first triangular prisms has a first triangular cross section having a first line, a second line, and a third line, the first line being longer than the second line and longer than the third line, each of the second triangular prisms has a second triangular cross section having a first line, a second line, and a third line, the first line being longer than the second line and longer than the third line, and a plane defined by the first line of the first triangular cross section and a plane defined by the first line of the second triangular cross section intersect with one another.

2. The image display apparatus according to claim 1, wherein:
the first direction is along the first surface of the image display panel, and
the second direction is along the first surface of the image display panel.

3. The image display apparatus according to claim 2, wherein:
the first direction is parallel to the first surface of the image display panel, and
the second direction is parallel to the first surface of the image display panel.

4. The image display apparatus according to claim 1, wherein:
the image display panel has a rectangular shape having a shorter side and a longer side longer than the shorter side, and
the shorter side extends along the first direction, and the longer side extends along the second direction.

5. The image display apparatus according to claim 1, wherein:
the first variable deflection element includes a first liquid crystal layer comprising liquid crystal, and the first liquid crystal layer is configured to change a refractive index thereof in accordance with a voltage applied thereto, thereby changing the deflection direction of the light, and
the second variable deflection element includes a second liquid crystal layer comprising liquid crystal, and the second liquid crystal layer is configured to change a refractive index thereof in accordance with a voltage applied thereto, thereby changing the deflection direction of the light.

6. The image display apparatus according to claim 5, wherein:
the first variable deflection element includes a first substrate and a second substrate opposing the first substrate, the first triangular prisms and the first liquid crystal layer are arranged between the first substrate and the second substrate, and the liquid crystal of the first liquid crystal layer is sealed between the first substrate and the second substrate, and
the second variable deflection element includes a third substrate and a fourth substrate opposing the third substrate, the second triangular prisms and the second liquid crystal layer are arranged between the third substrate and the fourth substrate, and the liquid crystal of the second liquid crystal layer is sealed between the third substrate and the fourth substrate.

7. The image display apparatus according to claim 6, wherein:
the first substrate of the first variable deflection element includes a first electrode, the second substrate of the variable deflection element includes a second electrode, the liquid crystal of the first liquid crystal layer is located between the first electrode and the second electrode, and the first electrode and the second electrode are configured to be applied with a first variable voltage, and
the third substrate of the second variable deflection element includes a third electrode, the fourth substrate of the second variable deflection element includes a fourth electrode, the liquid crystal of the second liquid crystal layer is located between the third electrode and the fourth electrode, and the third electrode and the fourth electrode are configured to be applied with a second variable voltage.

8. The image display apparatus according to claim 7, wherein:
the first variable deflection element changes the deflection direction of the light along the second direction according to the first variable voltage, and
the second variable deflection element changes the deflection direction of the light along the second direction according to the second variable voltage.

9. The image display apparatus according to claim 8, further comprising a controller configured to control the first variable voltage and the second variable voltage according to the user position detected by the position detector.

10. The image display apparatus according to claim 9, wherein the controller is communicably coupled to the first electrode, the second electrode, the third electrode, and the fourth electrode.

11. The image display apparatus according to claim 5, wherein:
a refractive index of the liquid crystal of the first liquid crystal layer varies in response to the applied voltage,
a refractive index of the liquid crystal of the second liquid crystal layer varies in response to the applied voltage,
a minimum value of the refractive index of the liquid crystal of the first liquid crystal layer is substantially equal to a refractive index of the first triangular prisms, and
a minimum value of the refractive index of the liquid crystal of the second liquid crystal layer is substantially equal to a refractive index of the second triangular prisms.

12. The image display apparatus according to claim 1, wherein the first variable deflection element is configured to deflect the light within at least one side of a screen center in the second direction, and the second variable deflection element is configured to deflect the light within at least the other side of the screen center in the second direction.

13. The image display apparatus according to claim 12, wherein:
when the user position detected by the position detector is in one side of a screen center in the second direction, the second variable deflection element deflects the light, and
when the user position detected by the position detector is in the other side of a screen center in the second direction, the first variable deflection element deflects the light.

14. The image display apparatus according to claim 1, wherein:

the first triangular cross section of the each of the first triangular prisms is a first substantially right-triangular cross section, and the second triangular cross section of the each of the first triangular prisms is a second substantially right-triangular cross section.

15. The image display apparatus according to claim 1, wherein:

an image signal for right eye and an image signal for left eye to which a parallax is provided are alternately inputted into the image display panel in a time division manner, the light device includes:

a light guide plate having a pair of side surfaces and configured to guide light incident on the side surfaces, to an exit surface;

a first light source located so as to face one of the side surfaces and configured to emit illumination light for displaying an image for right eye;

a second light source located so as to face the other of the side surfaces and configured to emit illumination light for displaying an image for left eye; and a light control sheet configured to deflect the light emitted from the first light source and the second light source toward ahead of a center of the image display panel, and the first light source and the second light source alternately light up in synchronization with switching between the image signal for right eye and the image signal for left eye.

* * * * *